Sept. 3, 1968 H. W. EHRENSPECK Re. 26,448

REFLECTION ANTENNA EMPLOYING MULTIPLE DIRECTOR ELEMENTS AND MULTIPLE REFLECTION OF ENERGY TO EFFECT INCREASED GAIN

Original Filed May 11, 1959

INVENTOR.
HERMANN W. EHRENSPECK
BY Walter Rantz
Sherman K. Goldman
ATTORNEYS

United States Patent Office

Re. 26,448
Reissued Sept. 3, 1968

26,448

REFLECTION ANTENNA EMPLOYING MULTIPLE DIRECTOR ELEMENTS AND MULTIPLE REFLECTION OF ENERGY TO EFFECT INCREASED GAIN

Hermann W. Ehrenspeck, 94 Farnham St., Belmont, Mass. 02178

Original No. 3,122,745, dated Feb. 25, 1964, Ser. No. 812,565, May 11, 1959. Application for reissue Feb. 8, 1965, Ser. No. 448,903
4 Claims. (Cl. 343—819)

(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the United States Government for governmental purposes without payment to me of any royalty thereon.

This invention relates generally to directional antennas and more particularly to a modification of slow wave antennas to produce a reflection of energy from an array to cause it to traverse the array at least once before it is radiated and thereby increase gain.

The gain of slow wave antennas depends on the phase velocity of the surface wave travelling along it and the length of the antenna; however, for a given length there is an optimum phase velocity beyond which the gain decreases, therefore, for adjustment of antennas at optimum phase velocity, the gain becomes proportional to the antenna length.

The utilization of the concept of this invention whereby the use of a reflection arrangement to cause a traverse of at least part of the energy of an endfire slow wave array back along the array has been found to increase the effective length of the array and, therefore, cause an increase in antenna gain. The gain increase thus achieved is accomplished without extensive modification of the antenna or physically increasing the length.

Accordingly it is an object of this invention to provide a novel method and means for increasing gain of all types of slow wave antennas.

It is another object of this invention to provide an antenna of one-half or less of the usual antenna length for a given gain.

It is still another object of this invention to provide at least double gain for an antenna of a given length over that previously attainable.

It is a further object of this invention to provide a novel antenna with a very high ratio of front to back radiation.

It is a still further object of this invention to provide a structure to increase antenna gain while maintaining a feed at only one point.

Another object of this invention involves the provision of a novel endfire array arrangement that allows sharp narrow beam-width patterns with reduced sidelobes.

Still another object of this invention involves the provision of an antenna utilizable at high or low frequencies.

A further object of this invention involves the provision of an antenna suitable for flush mounting.

A still further object of this invention involves the construction of a novel endfire antenna of currently available material that [lend themselves] *lends itself* to standard mass production manufacturing techniques and *is* of less cost than antennas of similar gain.

These and other advantages, features and objects of the invention will become more apparent from the following description taken in connection with the illustrative embodiments in the accompanying drawings, wherein.

Figure 1:
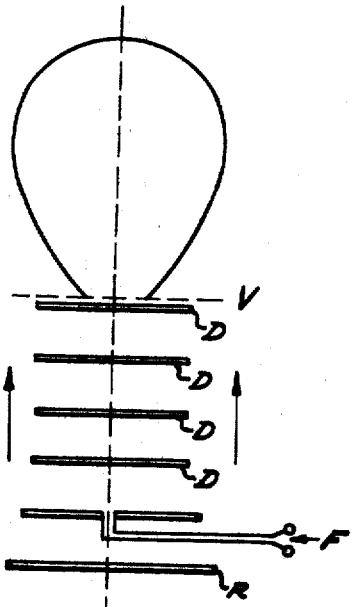
FIGURE 1 is a schematic representation of a conventional endfire antenna with the main lobe of its pattern.

Referring to FIGURE 1, a conventional endfire Yagi antenna is shown wherein the feed F at one end excites the array and the energy travels along the array by means of directors D with a phase velocity slower than that of light. Apart from a negligible amount radiated directly from the feeder F, the energy is radiated from a virtual aperture (shown in dashed lines) located at the termination of the array. The concept of the virtual aperture is more fully explained in my copending application Serial No. 719,698, filed Mar. 6, 1958, *now Patent No. 3,096,-520* titled Endfire Array, wherein the virtual aperture at the end of an array includes the field at which power levels are from maximum to 20 db below maximum. In most endfire arrays a linear reflector R is mounted behind the feeder, as shown in FIGURE 1, to increase the gain in the forward direction. The energy travels along the array in the direction of the arrows and radiates with the pattern (sidelobes omitted) indicated.

Figure 2:
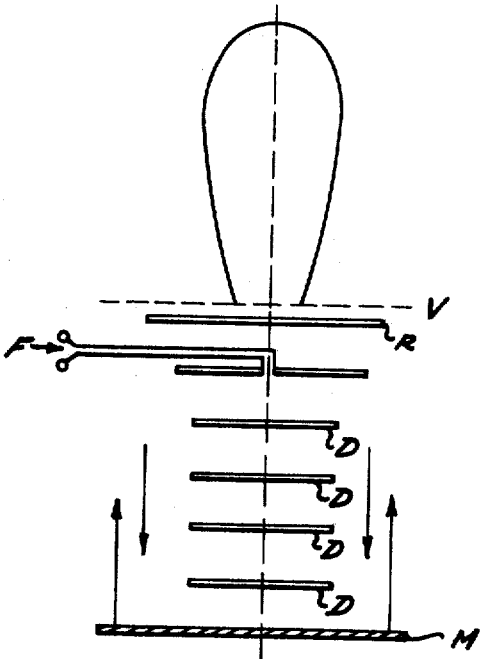
FIGURE 2 is a schematic representation of the backfire antenna embodiment of my invention with the main lobe of its pattern.

The phase front of a traveling wave lies substantially in a plane at the radiating end of an endfire array when the antenna is adjusted for optimum gain in the forward direction. The concept of this invention, embodied in the representation labeled FIGURE 2, allows the traveling wave to impinge on and be reflected by a planar reflector M such that the wave now travels along the array for a second time in the direction toward the feed. Then, the array of FIGURE 1 as modified by the use of this invention as shown in FIGURE 2 utilizes a feed F, a reflector R, *and a slow wave director structure comprising* directors D, and has a virtual aperture V. By placing the planar reflector M at what would normally be the end of the array, the new virtual aperture now appears at the feed end of the array. Reflectors R and M are spaced at their usual positions with respect to the array at approximately $\lambda/4$. The major part of the energy first travels along the array as shown by the inner arrows and travels in the opposite direction as indicated by the outer arrows to be radiated with a higher gain, narrower beamwidth pattern, as shown, in a diverse direction to that of FIGURE 1. The mirror action of the planar reflector M differs from the usual use and action of plane reflectors with linear or slow wave antennas. With a linear antenna a planar reflector causes constructive interference between the original antenna wave and the reflected one to increase the forward gain. Planar reflectors with slow wave structures have been used in the past to prevent backlobes. However, the waves impinging on the reflector in this case are not slow waves since the usual position is behind the feed. The mirror action of reflector M, since there is no direct wave with which to interefere as in the linear antenna case, and since it is situated in the main wave channel of a slow wave structure to reflect the slow wave energy, causes all the energy in the channel to retravel along the array thus creating a large increase in gain. This increase in gain is explainable by the fact that the retravel makes the antenna act like one double its length. In FIGURE 2 the gain would be at least equal to a factor of two [, except that reflector R may tend to reduce the gain factor slightly] *as is the increase in effective length of the antenna.* The narrow pattern with a high ratio of front to back radiation and decreased sidelobes with the attendant increase in virtual aperture V requires an adjustment of directors D for a new length suitable for an array which would normally be double in length. Linear reflector R, it has been found, causes a reflection of the energy toward reflector M; however, its effect on the slow wave returning down the array is to cause only negligible perturbations in the field. Element M is generally flat and should be as large as the virtual aperture for maximum gain; however, a slightly curved plate corresponding to the plane of the phase front in the virtual aperture or mesh screen or closely spaced linear elements may be used to form this reflector.

Figure 3:
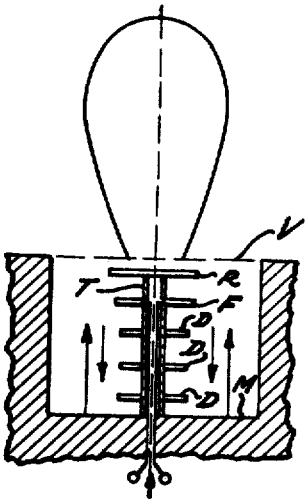
FIGURE 3 is a schematic representation of the embodiment of FIGURE 2 adapted for flush mounting.

FIGURE 3 is an example of the flush mounting of the antenna of FIGURE 2. In this figure, as in all the figures, like elements have the same designations. The feed F in this application is enclosed in a hollow tube T which supports the array and its elements and feeds the feeder elements which are insulated from tube T.

The backfire antennas of FIGURES 2 and 3 radiate in a direction reverse from normal with an effective length of double and a gain increase of at least 3 db above a conventional endfire array. A modification of the backfire antenna allows for further gain increases by utilizing multiple reflection.

Figure 4:
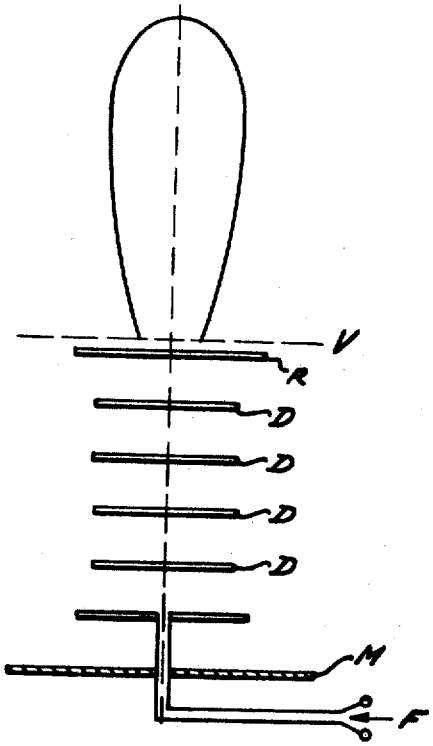
FIGURE 4 is a schematic representation of a multiple reflection endfire antenna embodiment with the main lobe of its pattern.

The multiple reflection concept is embodied in the schematic representation of FIGURE 4 where a feed F feeds *a slow wave director structure comprising* an array of directors D in front of which is placed a partial reflector R, while a reflector M is placed behind the feed, as shown. This structure modifies the principle of the backfire antenna in that only a part of the energy travelling along the antenna from the feed end to the output end is reflected by reflector R while the remainder is radiated in the normal endfire direction. As in the concept described relative to the backfire antenna, the reflected portion of the energy travels a second time along the antenna but in the opposite direction until it impinges upon its feed reflector M. In the multiple reflection antenna, M is a planar reflector which must be of such size as to reflect back as much of the surface wave energy possible and for maximum gain is of the same size as the virtual aperture. The energy then travels a third time along the antenna; this time in the normal endfire direction. After reaching the antenna end it is again partly radiated at the virtual aperture V and partly reflected back, as before. This process continues until all the energy has been radiated.

Maximum gain of the multiple reflection antenna with a mirror reflector M of the same size as the virtual aperture requires optimization of two parameters; the reflectivity of the partial reflector R at the radiating end, and the phase velocity along the antenna which is accomplished by adjustment of the length of directors D in accordance with the new effective length of the antenna.

Thus reversal of elements M and R of the backfire antenna and making R produce perturbations in the slow wave produces increased gain over the backfire antenna. The multiple reflection antenna has greater structural simplicity and strength since the feed is located at the same end as the reflector plane.

The partial reflector R or the planar reflector M may be of solid metal, metalized plastic, screening material, or of closely spaced rods either parallel or radially mounted. For optimized gain the individual elements D are decreased from the optimum value for a conventional endfire antenna for phase adjustment.

The multiple reflection principle may be applied to the backfire antenna to increase its gain by utilizing a partial reflector rather than a linear reflector in order to cause a partial reflection back along the array in accordance with the action described relative to FIGURE 4.

Although the invention has been described relative to particular embodiments, it will be understood to those skilled in the art that the invention is capable of a variety of alternative embodiments, for example, the methods of increasing gain are applicable to all types of slow wave antennas such as the dielectric rod, cigar antenna, etc. Furthermore, the teachings of my aforementioned copending application are applicable to the backfire and multiple reflection antennas.

I intend to be limited only by the spirit and scope of the appended [claim] *claims.*

What is claimed is:

*1.* Means for increasing the gain and decreasing the sidelobes of a multiple director type of antenna array comprising a planar reflector positioned at what would normally be the emitting end of the series of director elements, for reflecting energy back along said director elements in reverse sequence, for emission at the end of said array where the energy traverse began.

*2. A backfire antenna comprising a slow wave director structure, a feed located with respect to said structure to transmit energy therealong, reflecting means for reflecting all of the energy at one end of said structure back along and bound to said structure with a 180° phase shift at said reflecting means, and reflector means at the other end of said structure for reflecting part of the energy transmitted directly from said feed back along said structure and part of the energy reflected from said reflecting means, the energy at said reflector means being in an in-phase relationship for maximum gain, the part of the energy not reflected by said reflector means being radiated into free space.*

*3. A backfire antenna as defined in claim 2 which produces an increased virtual aperture; the size of said reflecting means being as large as the virtual aperture.*

*4. A multiple reflection antenna comprising a slow wave director structure, a feed at one end of said director structure, a planar reflector at the end of said slow wave director structure behind said feed for reflecting the energy in the wave channel of said antenna back along said structure, and partial reflector means at the end of said structure opposite said feed end for reflecting part of the reflected slow wave energy back toward said first-mentioned reflector and radiating part of the slow wave energy.*

References Cited

The following references, cited by the Examiner, are of record in the patented file of this patent or the original patent.

UNITED STATES PATENTS

| | | | |
|---|---|---|---|
| 2,822,536 | 2/1958 | Sandretto | 343—840 |
| 2,841,792 | 7/1958 | Edson | 343—819 |
| 2,407,057 | 9/1946 | Carter | 343—840 |
| 2,627,028 | 1/1953 | Nowak | 343—761 |

FOREIGN PATENTS

| | | |
|---|---|---|
| 741,897 | 12/1955 | Great Britain. |
| 751,249 | 6/1956 | Great Britain. |

ELI LIEBERMAN, *Primary Examiner.*